(12) United States Patent
Kao et al.

(10) Patent No.: US 7,518,678 B2
(45) Date of Patent: Apr. 14, 2009

(54) SUB-PIXEL FOR TRANSFLECTIVE LCD PANEL COMPRISING A SECOND PHOTORESIST FORMED IN REFLECTIVE REGION AND TRANSFLECTIVE LCD PANEL USING THE SAME (75) Inventors: Yang-Min Kao, Tainan County (TW); Chao-Lien Lin, Tainan County (TW); Cheng-Jen Chu, Tainan County (TW)

(73) Assignee: Chi Mei Optoelectronics Corp., Tainan County (TW)

( * ) Notice: Subject to any disclaimer, the term of this patent is extended or adjusted under 35 U.S.C. 154(b) by 348 days.

(21) Appl. No.: 11/622,768

(22) Filed: Jan. 12, 2007

(65) Prior Publication Data

US 2007/0165161 A1 Jul. 19, 2007

(30) Foreign Application Priority Data

Jan. 17, 2006 (TW) ............................... 95101759 A (51) Int. Cl.
G02F 1/1335 (2006.01)
G03F 1/00 (2006.01)

(52) U.S. Cl. ............................ 349/114; 349/106; 430/7
(58) Field of Classification Search ................. 349/114, 349/106, 110, 138, 108, 65; 345/590; 430/7
See application file for complete search history.

(56) References Cited

U.S. PATENT DOCUMENTS 7,123,321 B2 * 10/2006 Inada et al. .................. 349/106
7,206,046 B2 * 4/2007 Ko et al. ..................... 349/114

* cited by examiner

*Primary Examiner*—Thoi V Duong (57) ABSTRACT

A sub-pixel of a liquid crystal display panel includes a first substrate, a second substrate, and a liquid crystal layer formed between the first and second substrates. A color filter layer is formed on the first substrate and includes a first photoresist formed on a transparent region and a reflective region of the sub-pixel for blocking light of wavelengths outside a first range, a second photoresist formed on the reflective region of the sub-pixel for blocking light of wavelengths outside a second range that is different from the first range, and an intermediate area formed between and free of the first and second photoresists.

20 Claims, 8 Drawing Sheets

SUB-PIXEL FOR TRANSFLECTIVE LCD PANEL COMPRISING A SECOND PHOTORESIST FORMED IN REFLECTIVE REGION AND TRANSFLECTIVE LCD PANEL USING THE SAME

The instant application is based on and claims priority from Taiwanese Application Serial No. 095101759, filed on Jan. 17, 2006, which is incorporated by reference herein in its entirety.

TECHNICAL FIELD

The disclosure relates to a sub-pixel for a transflective liquid crystal display panel and transflective liquid crystal display and panel using such sub-pixel, and more particularly, to a sub-pixel having two photoresists of different colors, a transflective liquid crystal display panel and a transflective liquid crystal display using the same.

BACKGROUND

Figure 1:
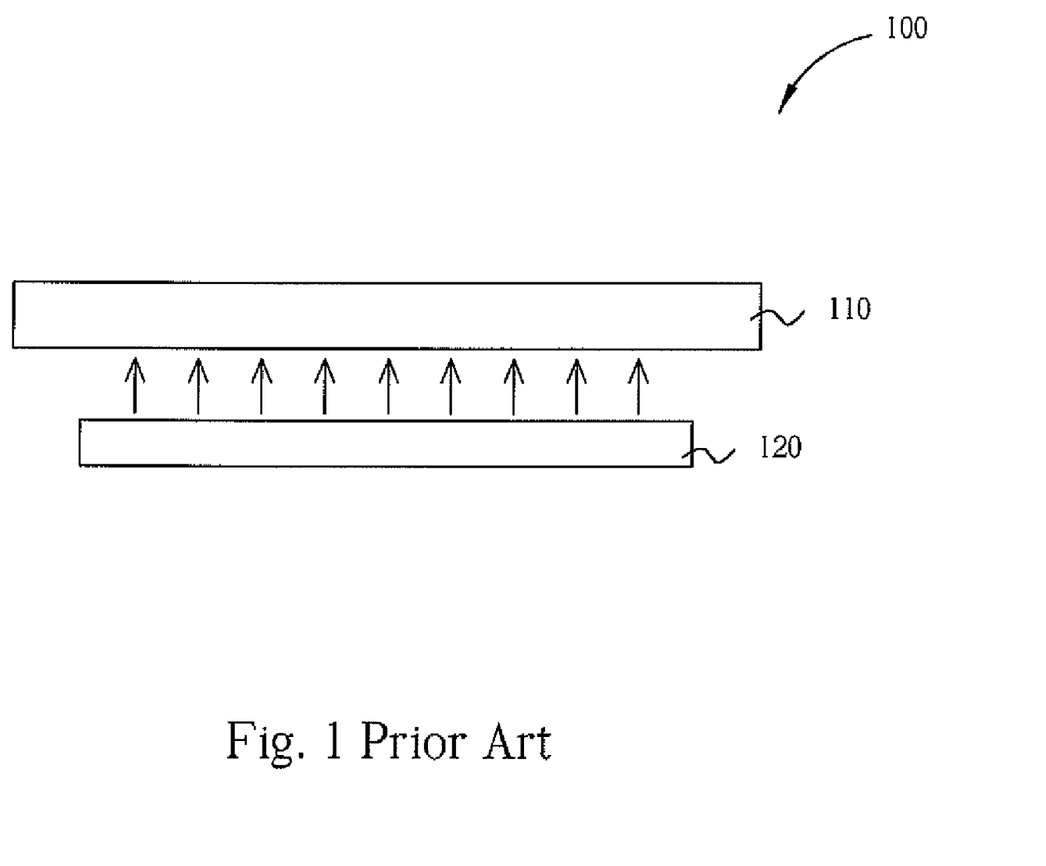
FIG. 1 is a side view of a prior art transflective liquid crystal display.
Figure 2:
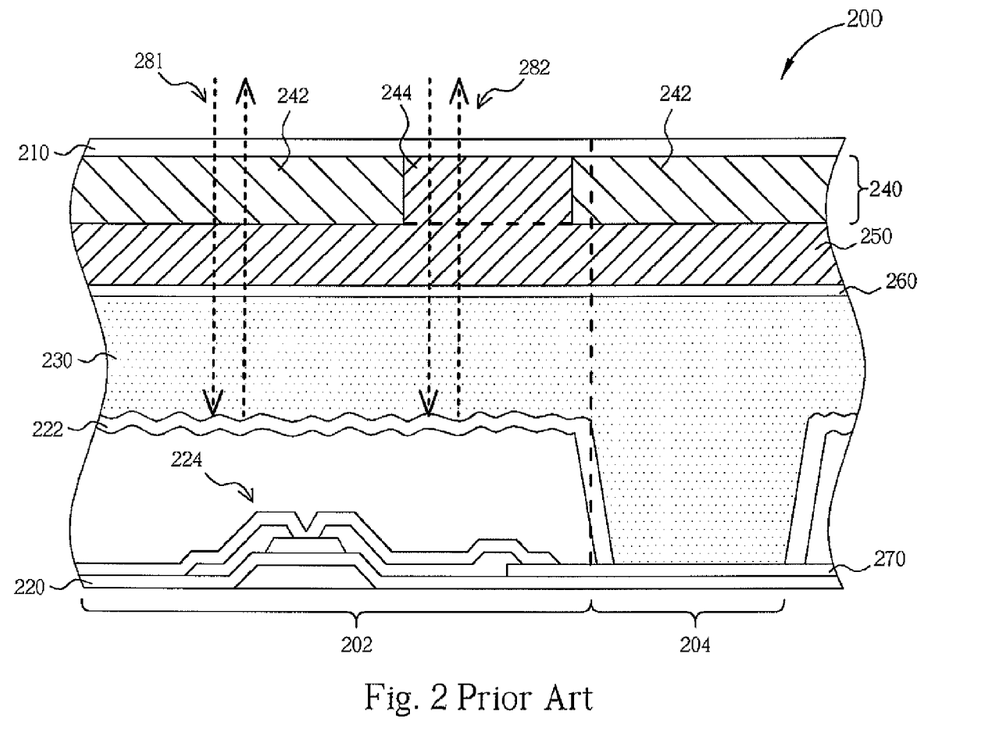
FIG. 2 is a cross sectional enlarged view of a sub-pixel of the LCD panel of the liquid crystal display in FIG. 1.

FIG. 1 is a side view of a prior art transflective liquid crystal display (LCD) 100 which comprises an LCD panel 110 and a backlight module 120. FIG. 2 is a cross sectional enlarged view of a sub-pixel 200 of the LCD panel 110. The LCD panel 110 comprises a plurality of main pixels for displaying an image. Each of the main pixels is composed of at least three sub-pixels which are red, blue and green sub-pixels. As shown in FIG. 2, the sub-pixel 200 is formed of a first transparent substrate 210, a second transparent substrate 220 opposed to the first substrate 210, and a liquid crystal layer 230 formed between the first and second substrates 210, 220. A color filter layer 240 is formed on the first substrate 210 and comprises a photoresist 242 laid in both a transparent region 204 and a reflective region 202 of the sub-pixel 200. The color filter layer 240 further comprises an opening 244 formed by removing part of the photoresist 242 laid in the reflective region 202 of the sub-pixel 200. On the color filter layer 240 is a flattening overcoat 250. The reflective region 202 of the sub-pixel 200 has a reflective layer 222 formed to reflect light. A thin film transistor switch 224 is formed on the second substrate 220 and is used to generate a potential difference between transparent electrodes 260, 270 so as to rotate the liquid crystals of the liquid crystal layer 230 accordingly and, hence, to control the amount of light passing through the liquid crystal layer 230.

When light is provided by the backlight module 120 to the transflective LCD panel 110 for displaying images, the light will pass through the transparent region 204 of the sub-pixel 200. When light is provided by the environment, such as sun light, the light will be reflected by the reflective layer 222 of the sub-pixel 200. In the prior art, the environmental light can be reflected in two different ways. Suppose the sub-pixel 200 is a red pixel, then light incident along a first path 281 will pass through the color filter layer 240 which will filter out non-red light, thus the reflected light will be red light. Additionally, light incident along a second path 282 will not pass through any color filter layer, thus the reflected light will be generally the same as the environmental light which is generally white light. The same applies to green and blue pixels which will not be described herein.

Figure 3:
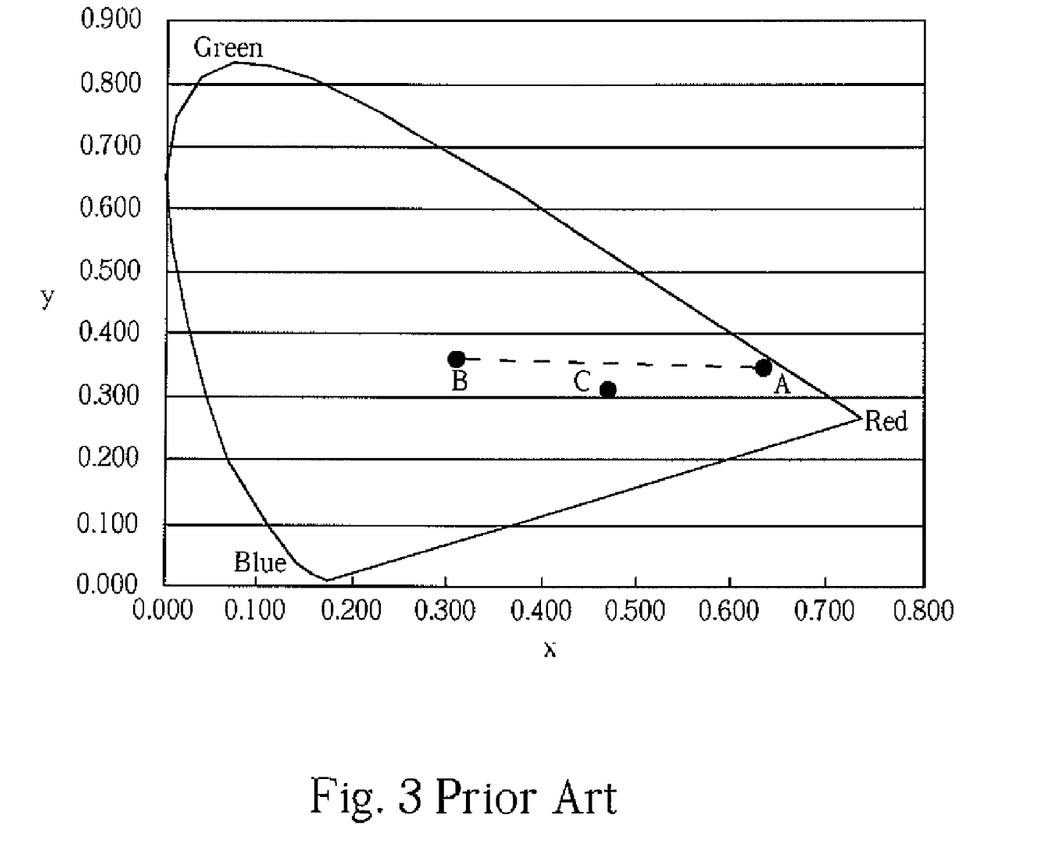
FIG. 3 is a graph in the CIE coordinate system illustrating the color gamut of the sub-pixel in FIG. 2 in the case that the sub-pixel is a red pixel.

FIG. 3 is a graph in the CIE coordinate system illustrating the color gamut of the sub-pixel 200 if the sub-pixel 200 is a red pixel. Continue with the aforementioned example, if the environmental light is incident along the first path 281, the reflected light will have a color gamut identified as point A. If the environmental light is incident along the second path 282, the reflected light will have a color gamut identified as point B. The reflective region 202 of the sub-pixel 200 will mix the reflected red light and the reflected white light to generate light with a color gamut on the dash line between point A and point B.

The type and thickness of the photoresist 242 of the color filter layer 242 are determined according to parameters of a specific light source intended for use in the backlight module 120, such as a D65 light source, which generates white light with a color temperature of 6500K, so that the transparent region 204 of the sub-pixel 200 can provide the desired performance. Once the type and thickness of the photoresist 242 have been determined, the photoresist 242 is laid in the reflective region 202 and the transparent region 204. However, after that, the color gamut of the light reflected from the reflective region 202 can only be adjusted by varying the area of the opening 244. Thus the color gamut of the light reflected from the reflective region 202 can only be adjusted to fall on a point of the dash line between point A and Point B in FIG. 3, which often cannot fully satisfy the user's demand. For example, if a calculation result of the overall color gamut including the reflective region 202 and the transparent region 204 indicates that the optimized color gamut of the reflective region 202 should be identified as point C in FIG. 3, then the color gamut of light output from the reflective region 202 can never meet such requirement regardless of how the opening 244 is changed, because point C is not on the dash line between point A and point B.

SUMMARY

In an aspect, a sub-pixel for a transflective liquid crystal display panel comprises a first substrate, a color filter layer formed on the first substrate, a second substrate opposed to the first substrate, and a liquid crystal layer formed between the first substrate and the second substrate. The color filter layer comprises a first photoresist formed in a transparent region and a reflective region of the sub-pixel for filtering out light of wavelengths outside a first range, a second photoresist formed in the reflective region of the sub-pixel for filtering out light of wavelengths outside a second range which is different from the first range, and an intermediate area formed between and free of the first photoresist and the second photoresist.

In a further aspect, a liquid crystal display panel or a liquid crystal display incorporating such panel comprises a plurality of main pixels, each of said main pixels comprising a number of sub-pixels at least one of which is of the type disclosed immediately above.

The objectives and features of embodiments of the present invention will become apparent to those of ordinary skill in the art after reading the following detailed description of the embodiments illustrated in the attached drawings.

DETAILED DESCRIPTION

Figure 4:
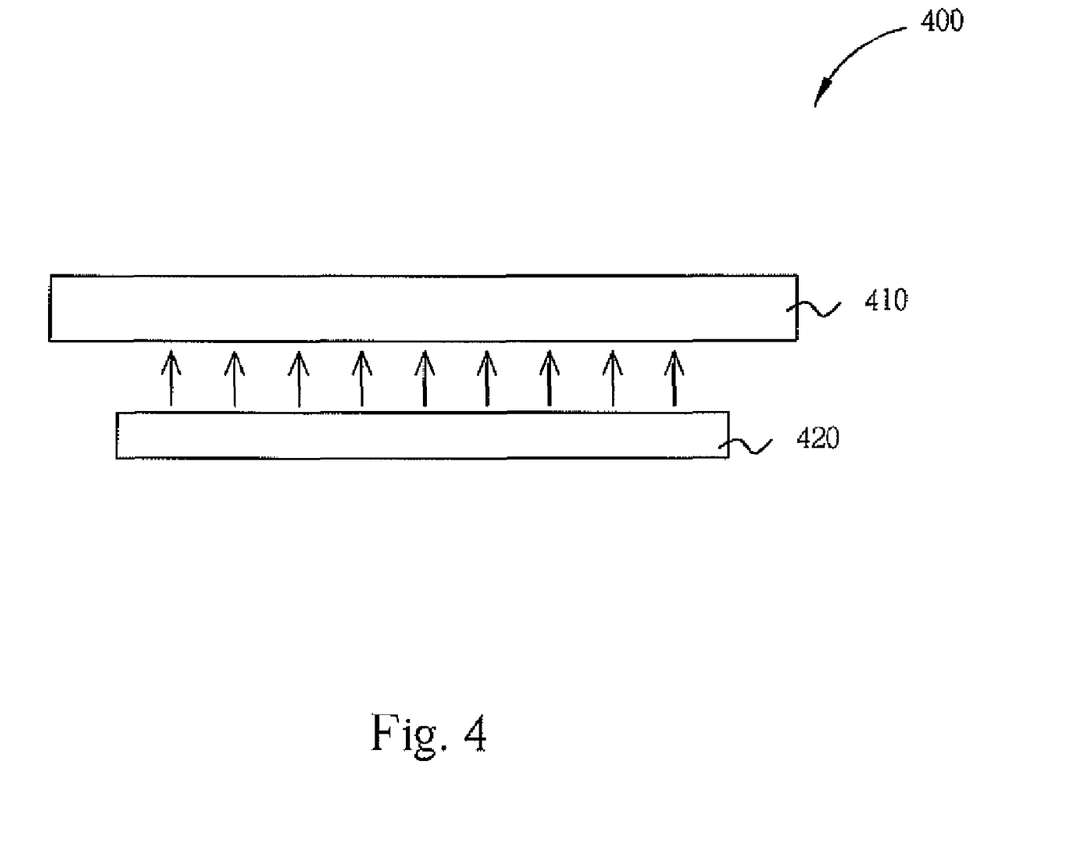
FIG. 4 is a side view of a transflective liquid crystal display according to an embodiment of the present invention.
Figure 5:
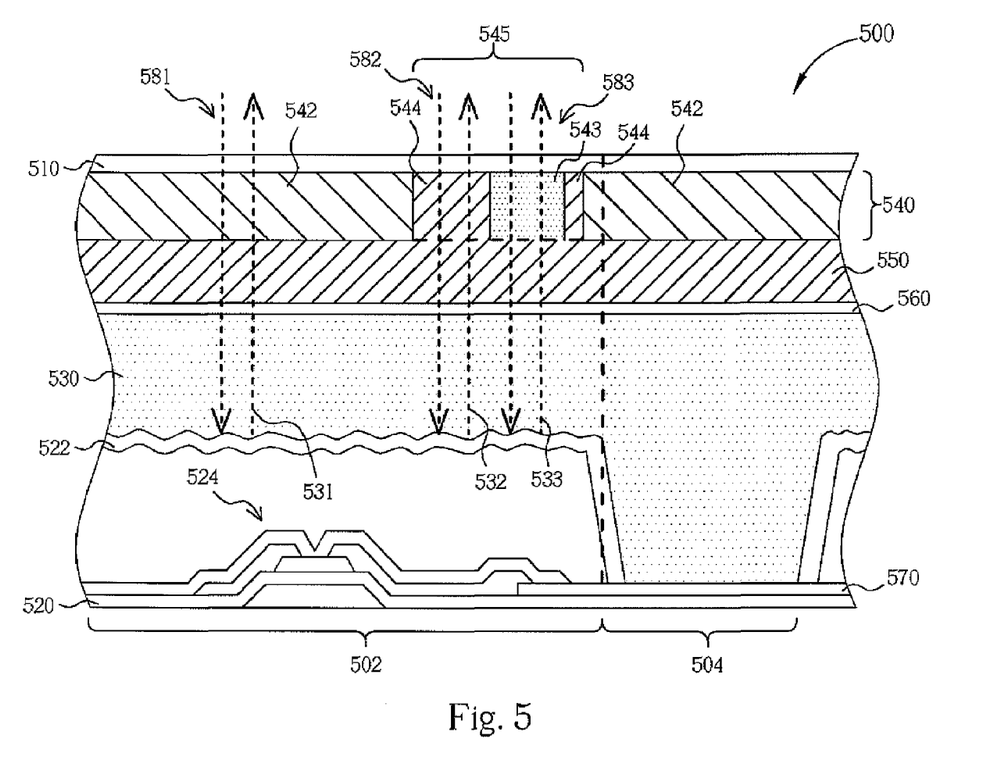
FIG. 5 is a cross sectional enlarged view of a sub-pixel of an LCD panel of the liquid crystal display in FIG. 4.
Figure 6:
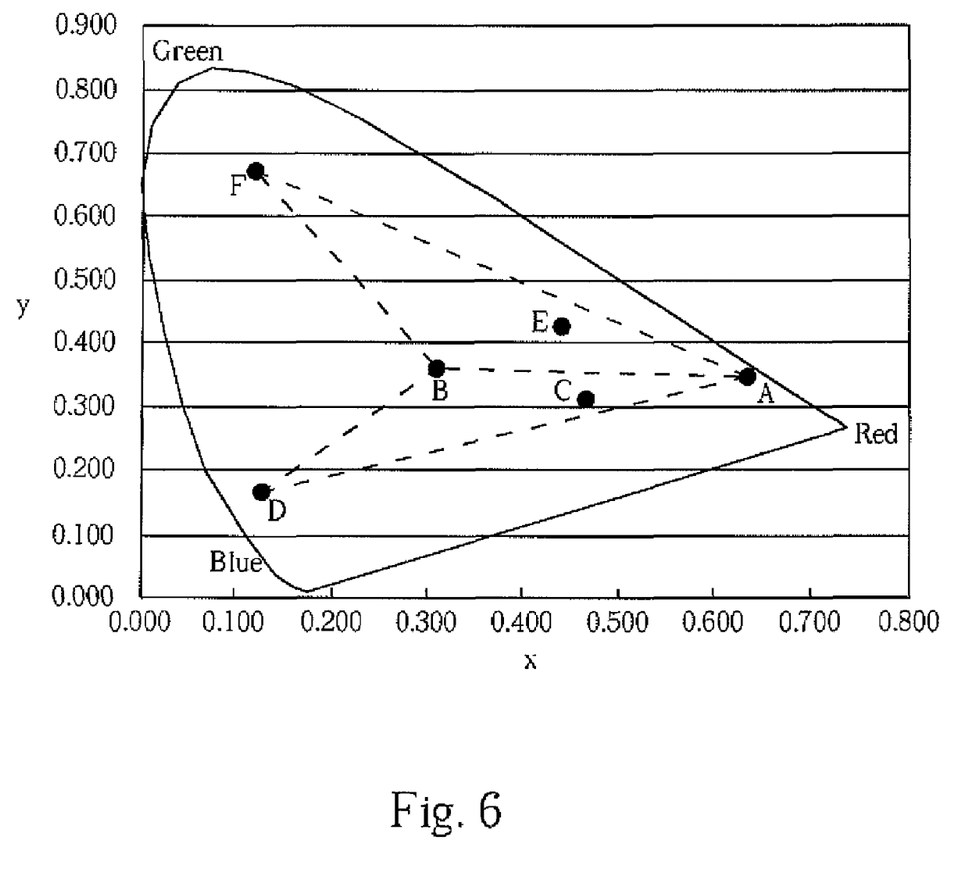
FIG. 6 is a graph in the CIE coordinate system illustrating the color gamut of the sub-pixel in FIG. 5 in the case that the sub-pixel is a red pixel.

FIG. 4 is a side view of a transflective liquid crystal display (LCD) 400 which comprises an LCD panel 410 and a backlight module 420 according to an embodiment of the present invention. The LCD panel 410 comprises a plurality of sub-pixels arranged in a matrix manner (not shown). FIG. 5 is a cross sectional enlarged view of a sub-pixel 500 of the LCD panel 410. FIG. 6 is a graph in the CIE coordinate system illustrating the color gamut of the sub-pixel 400 in the case that the sub-pixel 400 is a red pixel.

As shown in FIG. 5, the sub-pixel 500 of the LCD panel 410 comprises a first transparent substrate 510, a second transparent substrate 520 opposed to the first substrate 510, and a liquid crystal layer 530 formed between the first and second substrates 510, 520. A color filter layer 540 is formed on the first substrate 510 and comprises a first photoresist 542 laid in both a transparent region 504 and a reflective region 502 of the sub-pixel 500. The color filter layer 540 further comprises an area 545 which is free of the first photoresist 542 and is formed by, e.g., removing part of the photoresist 542 laid in the reflective region 502 of the sub-pixel 500. Further, part of the area 545 is filled with a second photoresist 543 so that the remaining portion 544 of the area 545 may be formed between the first photoresist 542 and the second photoresist 543. The remaining portion 544 is free of the first and second photoresists 542, 543 and functions as an opening in the color filter layer 540. In the specifically disclosed embodiment of FIG. 5, the remaining portion 544 is filled with the material of a flattening overcoat 550 which is also formed on the color filter layer 540. The reflective region 502 of the sub-pixel 200 has a reflective layer 522 formed to reflect light. A thin film transistor switch 524 is formed on the second substrate 520 and is used to generate a potential difference between transparent electrodes 560, 570 so as to rotate the liquid crystals of the liquid crystal layer 530 accordingly and, hence, to control the amount of light passing through the liquid crystal layer 530.

When light is provided by the backlight module 420 to the transflective LCD panel 410 for displaying images, the light will pass through the transparent region 504 of the sub-pixel 500. When light is provided by the environment, such as sun light, the light will be reflected by the reflective layer 522 of the sub-pixel 500. In this embodiment, the environmental light will be reflected in three different ways. Suppose the sub-pixel 500 is a red pixel, the first photoresist 542 is a red photoresist, and the second photoresist 543 is a blue photoresist, then light incident along a first path 581 will pass through the first photoresist 542 which will filter out non-red light, thus the reflected light 531 will be red light. Further, light incident along a second path 582 will not pass through any color filter, thus the reflected light 532 will be generally the same as the environmental light which is, in an embodiment, white light. Finally, light incident along a third path 583 will pass through the second photoresist 543 which will filter out non-blue light, thus the reflected light 533 will be blue light.

As shown in FIG. 6, if the environmental light is incident along the first path 581, the reflected light 531 will have a color gamut identified as point A. If the environmental light is incident along the second path 582, the reflected light 532 will have a color gamut identified as point B. If the environmental light is incident along the third path 583, the reflected light 533 will have a color gamut identified as point D. The reflective region 502 of the sub-pixel 500 will mix the red light 531, the white light 532, and the blue light 533 to generate light with a color gamut within a triangular region defined by point A, point B and point D, allowing the color gamut of light reflected by the reflective region 502 of the sub-pixel 500 to be adjustable in a 2-dimensional space, which is a great improvement over the prior art where the color gamut of light reflected by the reflective region 202 of the sub-pixel 200 is only adjustable in a 1-dimensional space.

Thus, after determining the type and the thickness of the first photoresist 542 for the transparent region 504 of the sub-pixel 500, if it is required for the reflective region 502 of the sub-pixel 500 to generate light with a color gamut identified as, e.g., point C, then this can be implemented by adjusting the configurations and/or the areas of the opening 544 and/or the second photoresist 543, e.g., by adjusting the areas of the opening 544 and the second photoresist 543 relative to the area of the first photoresist 542 or the whole color filter layer 540.

Similarly, if it is required for the reflective region 502 of the sub-pixel 500 to generate light with a color gamut identified as, e.g., point E, then this can be implemented by using a green photoresist for the second photoresist 543, so that the reflective region 502 of the sub-pixel 500 can generate light with a color gamut within a triangular region defined by point A, point B and point F. Again, the configurations and/or the areas of the opening 544 and/or the second photoresist 543 can be adjusted to provide the desired color gamut.

In the above disclosed embodiments, the sub-pixel 500 is a red sub-pixel and, hence, the first photoresist 542 is a red photoresist while and the second photoresist 543 is a blue or green photoresist. However, the present invention further includes embodiments where the sub-pixel 500 is a green sub-pixel and, hence, the first photoresist 542 is a green photoresist while and the second photoresist 543 is a blue or red photoresist, and where the sub-pixel 500 is a blue sub-pixel and, hence, the first photoresist 542 is a blue photoresist while the second photoresist 543 is a green or red photoresist. It is also within the scope of the invention to provide embodiments in which some or all main pixels of the LCD panel 410 include at least one type of the above disclosed two-photoresist sub-pixels.

Additionally, after the red, green and blue sub-pixels of a main pixel have been customized to provide the desired single color gamuts, the light composed by the three sub-pixels may still not be exactly white in the white-light (color-mixed) display mode. For example, if the red sub-pixel has a higher brightness, then the white light composed by the three sub-pixels will be slightly red biased. The invention provides further embodiments, for example, as illustrated in FIGS. 7 and 8, to remedy this situation.

Figure 7:
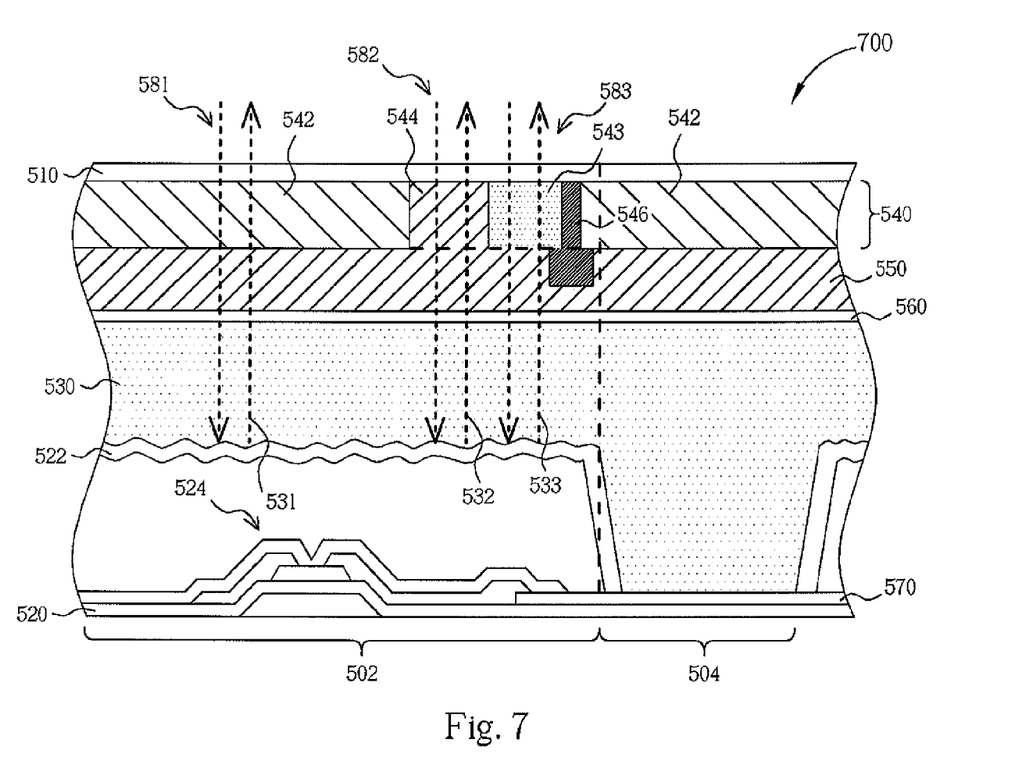
FIGS. 7 and 8 are cross sectional enlarged views of sub-pixels of the LCD panel of the liquid crystal display in FIG. 4 with light shielding materials, in accordance with further embodiments.
Figure 8:
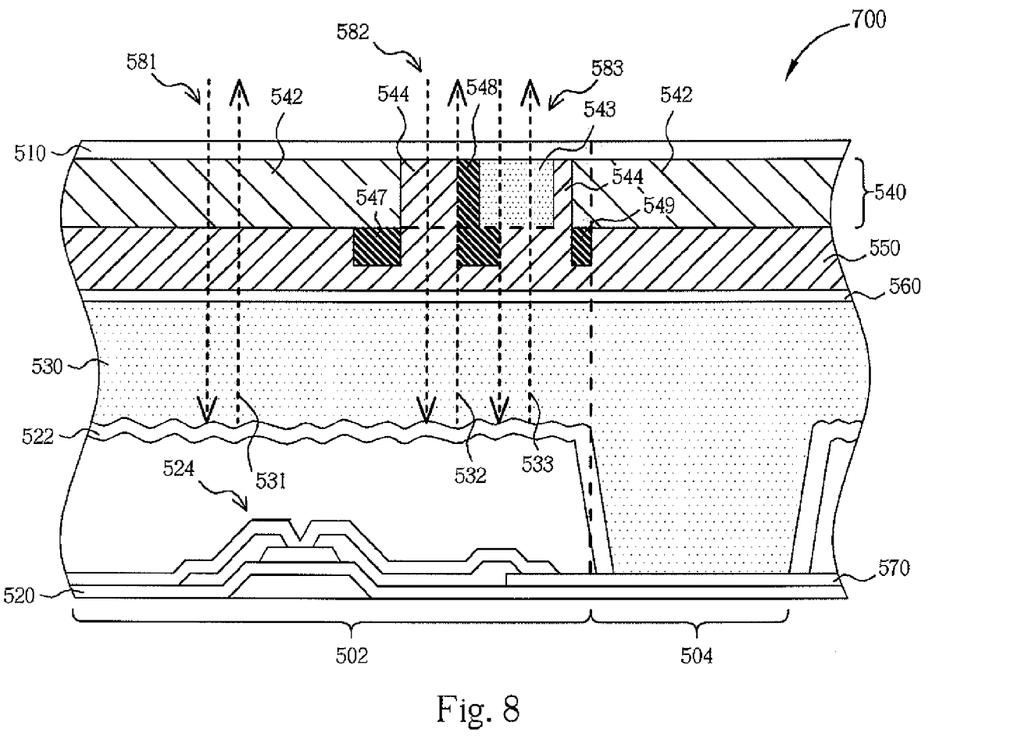

FIGS. 7 and 8 are cross sectional enlarged views of red sub-pixels 700, 800, respectively, filled with light shielding materials. Suppose a simulation result during a design stage of pixels indicates that the white light composed by the three sub-pixels is slightly red biased, then a light shielding material can be added to form a light shield 546 as shown in FIG. 7, or a light shielding material can be added to form light shields 547, 548, 549 as shown in FIG. 8. The light shielding materials are added to shield the light reflected along one or more of the paths 581, 582, 583, so that the color gamut of red light output from the reflective region 502 will remain the same even after the light shielding materials are added. This can be done, for example, by configuring the light shield(s) such that the light shield(s) 546, or 547, 548 and 549 partially cover(s) the areas of the first photoresist 542, the second photoresist 543, and the opening 544 while preserving the ratios of the uncovered areas of the opening 544 and the second photoresist 543 to the uncovered area of the first photoresist 542. As a result, the color gamut of the sub-pixel after adding the light shield(s) will not deviate from the desired one.

By adding the light shielding materials, the brightness of the red sub-pixel will be reduced to optimize the color temperature of the white light composed by the three sub-pixels. Similarly, if the green and/or blue sub-pixel(s) need(s) brightness adjustment, then similar light shields can be added to the green and/or blue sub-pixel(s) to adjust the brightness of the green and/or blue sub-pixel(s).

Compared to the prior art, the sub-pixel 500, 700 of the LCD panel 410 has the first photoresist 542 and the second photoresist 543 of two different colors, therefore the light output from the reflective region 502 can be adjusted in a two dimensional space of a color gamut coordinate system, such as CIE 1931 as shown in FIG. 6, at least in the design stage of pixels. Thus, user-defined specifications can be easily fulfilled.

Those skilled in the art will readily observe that numerous modifications and alterations of the disclosed device and method may be made within the scope of the invention which is limited only by the metes and bounds of the appended claims.

The invention claimed is:

1. A sub-pixel of a transflective liquid crystal display panel, said sub-pixel comprising:
   a first substrate;
   a color filter layer formed on the first substrate comprising:
      a first photoresist formed in a transparent region and a reflective region of the sub-pixel for filtering out light of wavelengths outside a first range;
      a second photoresist formed in the reflective region of the sub-pixel for filtering out light of wavelengths outside a second range which is different from the first range; and
      an intermediate area formed between and free of the first photoresist and the second photoresist;
   a second substrate opposed to the first substrate; and
   a liquid crystal layer formed between the first substrate and the second substrate.

2. The sub-pixel of claim 1, wherein the first and second substrates are transparent substrates.

3. The sub-pixel of claim 2, further comprising a thin film transistor switch for driving the liquid crystal layer.

4. The sub-pixel of claim 2, further comprising a reflective layer formed on the second substrate in the reflective region for reflecting light.

5. The sub-pixel of claim 2, further comprising an overcoat formed on the color filter layer.

6. The sub-pixel of claim 1, further comprising at least a light shield for partially blocking light passing through at least one of said first photoresist, said second photoresist and said intermediate area.

7. A liquid crystal display panel, comprising a plurality of main pixels, each of said main pixels comprising a number of sub-pixels at least one of which is the sub-pixel of claim 6.

8. The sub-pixel of claim 1, being a red sub-pixel, wherein the first photoresist is a red photoresist.

9. The sub-pixel of claim 8, wherein the second photoresist is one of a green photoresist and a blue photoresist.

10. The sub-pixel of claim 1, being a blue sub-pixel, wherein the first photoresist is a blue photoresist.

11. The sub-pixel of claim 10, wherein the second photoresist is one of a green photoresist and a red photoresist.

12. The sub-pixel of claim 1, being a green sub-pixel, wherein the first photoresist is a green photoresist.

13. The sub-pixel of claim 12, wherein the second photoresist is one of a red photoresist and a blue photoresist.

14. The sub-pixel of claim 1, further comprising a light shield for partially blocking light passing through at least one of said first photoresist, said second photoresist and said intermediate area, without affecting the color gamut of the light reflected by said reflective region.

15. A liquid crystal display panel, comprising a plurality of main pixels, each of said main pixels comprising a number of sub-pixels at least one of which is the sub-pixel of claim 1.

16. A liquid crystal display, comprising:
   a transflective liquid crystal display panel comprising:
      a first substrate;
      a color filter layer formed on the first substrate;
      a second substrate opposed to the first substrate; and
      a liquid crystal layer formed between the first substrate and the second substrate; and
      wherein said panel is divided into a plurality of sub-pixels at least one of which comprises, in the color filter layer:
         a first photoresist formed in a transparent region and a reflective region of said sub-pixel for filtering out light of wavelengths outside a first range;
         a second photoresist formed in the reflective region of said sub-pixel for filtering out light of wavelengths outside a second range which is different from the first range; and
         an intermediate area formed between and free of the first photoresist and the second photoresist; and
   a backlight module for providing light to the transparent regions of the sub-pixels.

17. The liquid crystal display of claim 16, wherein the liquid crystal display panel further comprises, in at least one of said sub-pixels, at least a light shield for partially blocking light passing through at least one of said first photoresist, said second photoresist and said intermediate area of said sub-pixel.

18. The liquid crystal display of claim 17, wherein said light shield is configured such that said light shield does not affect the color gamut of the light reflected by said reflective region through said first photoresist, said second photoresist and said intermediate area.

19. The liquid crystal display of claim 16, wherein
   said sub-pixels comprise red, green and blue sub-pixels; and
   the first photoresist in each said red, green or blue sub-pixel is a red, green or blue photoresist, respectively.

20. The liquid crystal display of claim 19, wherein
   the second photoresist in at least one of said red sub-pixels is one of a green photoresist and a blue photoresist;
   the second photoresist in at least one of said green sub-pixels is one of a red photoresist and a blue photoresist; and
   the second photoresist in at least one of said blue sub-pixels is one of a green photoresist and a red photoresist.

* * * * *